US008311335B2

(12) United States Patent
Rodriguez Serrano et al.

(10) Patent No.: US 8,311,335 B2
(45) Date of Patent: Nov. 13, 2012

(54) MODEL-BASED COMPARATIVE MEASURE FOR VECTOR SEQUENCES AND WORD SPOTTING USING SAME

(75) Inventors: Jose A. Rodriguez Serrano, Nottingham (GB); Florent C. Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 961 days.

(21) Appl. No.: 12/361,178

(22) Filed: Jan. 28, 2009

(65) Prior Publication Data
US 2010/0191532 A1 Jul. 29, 2010

(51) Int. Cl.
*G06K 9/18* (2006.01)
(52) U.S. Cl. ....................................... 382/186
(58) Field of Classification Search .................. 382/186
See application file for complete search history.

(56) References Cited

U.S. PATENT DOCUMENTS

| 6,009,390 A | 12/1999 | Gupta et al. |
| 2009/0060335 A1 | 3/2009 | Rodriguez Serrano et al. |

OTHER PUBLICATIONS

Bahlmann et al., "Measuring HMM Similarity with the Bayes Probability of Error and its Application to Online Handwriting Recognition," ICDAR, (2001).
Huang et al., "Semi-continuous hidden Markov models for speech signals," in: Readings in speech recognition, pp. 340-346 (1990).
Huo et al., "A DTW-based dissimilarity measure for left-to-right hidden Markov models and its application to word confusability analysis", Interspeech ICLSP (2006).
Jebara et al., "Spectral Clustering and Embedding with Hidden Markov Models," ECML '07 (2004).
Jebara et al., "Probability Product Kernels," Journal of Machine Learning Research, 5:819-844 (2004).
Rath et al., "Features for Word Spotting in Historical Manuscripts," ICDAR (2003).
Serrano et al., "Handwritten word-spotting using hidden Markov models and universal vocabularies," Pattern Recognition (2009), doi: 10.1016/j.patcog2009.02.2005.
Rodriguez et al., "Score Normalization for HMM-based word Spotting Using a Universal Background Model," ICFHR (2008).
Rabiner, "A Tutorial on Hidden Markov Models and Selected Applications in Speech Recognition," Proc. of the IEEE 77 pp. 257-286 (1989).
Sakoe et al., "Dynamic Programming Algorithm Optimization for Spoken Word Recognition," IEEE Transactions on Acoustics, Speech and Signal processing, pp. 159-165 (1978).
Connell, Scott., "A Comparison of Hidden Markov Model Features for the Recognition of Cursive Handwriting", 1996, M. Sc. Thesis, Michigan State University, XP002638539, pp. 1-154.
Duchateau et al., "Fast and accurate acoustic modelling with semi-continuous HMMs", 1998, Speech Communication, vol. 24, XP002638538, pp. 5-17.
Elms, et al., "The advantage of using an HMM-based approach for faxed word recogniton", 1998, vol. 1, XP002638712, pp. 18-36.
Huang, et al., "Semi-continuous hidden Markov models for speech signals", Jul. 1, 1989, vol. 3, No. 3, XP000359043, pp. 239-251.

(Continued)

*Primary Examiner* — John Strege
(74) *Attorney, Agent, or Firm* — Fay Sharpe LLP (57) ABSTRACT

An object comparison method comprises: generating a first ordered vector sequence representation of a first object; generating a second ordered vector sequence representation of a second object; representing the first object by a first ordered sequence of model parameters generated by modeling the first ordered vector sequence representation using a semi-continuous hidden Markov model employing a universal basis; representing the second object by a second ordered sequence of model parameters generated by modeling the second ordered vector sequence representation using a semi-continuous hidden Markov model employing the universal basis; and comparing the first and second ordered sequences of model parameters to generate a quantitative comparison measure.

23 Claims, 5 Drawing Sheets

OTHER PUBLICATIONS

Kurimo, Mikko., "Application of Learning Vector Quantization and Self-Organizing Maps for training continuous density and semi-continuous Markov models", 1994, Helsinki University of Technology, XP002638540, pp. 1-86.

Rodriguez-Serrano, et al., "A Similarity Measure Between Vector Sequences with Application to Handwritten Word Image Retrieval", Jun. 20, 2009, Computer Vision and Pattern Recognition, IEEE Converence ON, Piscataway, NJ, pp. 1722-1729.

European Search Report for Appl. No. EP 10151521 dated May 25, 2011.

MODEL-BASED COMPARATIVE MEASURE FOR VECTOR SEQUENCES AND WORD SPOTTING USING SAME

BACKGROUND

The following relates to the information processing arts, information retrieval arts, object classification arts, object recognition arts, object comparison arts, word spotting arts, and related arts.

Automated processing of handwritten documents can facilitate processing of forms, enable detection of documents relating to a certain subject, and so forth. Such processing begins by generating a digital image of the handwritten document, for example by optical scanning. In a technique known as optical character recognition (OCR) the digital image is processed to identify characters, such as letters or digits in the case of English textual content. For standardized text printed by a typewriter or marked by a printer using a computer-generated font, OCR can typically identify most or all of the text. However, OCR is less effective for handwritten textual context due to the larger variation in handwriting as compared with standardized molded typewriter letters or standardized computer type font. Substantial handwriting variation exists for a single human writer, and such variations are magnified further for documents written by numerous different human writers, as is often the case for bulk processing of filled-out business or government forms.

Word spotting employs a fundamentally different approach from OCR. Instead of attempting to identify each letter in order to convert the document image into text and then processing the OCR text, word spotting operates at the word or phrase level, in the image domain, to identify or "spot" words that are similar to a standard or representative word. Word spotting advantageously utilizes information about the overall form or shape of a word, and accordingly can be more accurate for handwritten textual content as compared with OCR. Moreover, word spotting is computationally efficient because it does not convert each individual letter of a word or phase.

Word spotting is used, for example, to sort or classify documents by identifying one, two, or a few keywords or key phrases in a document. Although described herein with respect to handwritten text, word spotting can also be applied to computer-generated or typewritten text in image form.

The basic word spotting process for handwritten documents entails: (1) optical scanning of the document pages; (2) segmenting the images to identify discrete word or phrase images; (3) extracting a quantitative representation of each word or phrase image; and (4) comparing the quantitative representations with a reference representation that was extracted from a word or phrase image (or a training set of word or phrase images) known to correspond to the word or phrase to be spotted. In a typical approach for the extraction operation (3), feature vectors are extracted at various points along the word or phrase image, with the points selected from left to right (or from right to left) so that an ordered sequence of feature vectors is generated. The comparison operation (4) then employs any suitable comparative measure for comparing the input and reference sequences of feature vectors.

A commonly used comparative measure is the dynamic time warping (DTW) distance measure, described for example in Sakoe et al., "Dynamic programming algorithm optimization for spoken word recognition", IEEE Transactions on Acoustics, Speech and Signal processing, pp. 159-65 (1978), which is incorporated herein by reference in its entirety. This distance measures a best matching alignment between the two sequences, and then accumulates a vector-by-vector comparison. The DTW distance measure is computationally efficient, and accounts for the elastic deformation of the handwritten word or phrase which is sometimes observed in handwriting comparisons. However, DTW utilizes a limited amount of information, namely the information contained in the input and reference vector sequences. DTW also does not provide a convenient way to incorporate a training set of reference word or phrase images.

Jebara et al., "Spectral clustering and embedding with hidden Markov models", In the 2007 European Conference on Machine Learning (ECML 2007), which is incorporated herein by reference, describes a probability product kernel (PPK)-based distance measure. In this approach, the extraction operation (3) employs a continuous hidden Markov Model (C-HMM), i.e. a HMM with continuous state emission probabilities. The state emission probabilities are generally Gaussian mixture models (GMM). The input and reference word or phrase models are thus C-HMMs. The comparison operation (4) then computes distances between the C-HMMs of the input and reference word or phrase images using a PPK. In this model-based approach, a reference model can be generated based on a training set of handwritten samples of the reference word or image, thus providing a substantial advantage over the DTW measure. However, the approach of Jebara et al. is computationally intensive, because the PPK computation essentially entails computing distances between states, i.e. between GMMs.

Moreover, neither DTW nor the approach of Jebara et al. incorporate a priori information about handwriting in general. That is, neither approach takes advantage of the knowledge that each handwritten word or phrase is made up of a set of handwritten letters or digits (or, more generally, symbols) chosen from an alphabet or other set of a priori known symbols. The inability to utilize this knowledge can adversely impact computational speed, accuracy, or both.

While word spotting is used herein as an illustrative example, the following relates more generally to the quantitative comparison of objects by (1) modeling the objects with ordered vector sequences and (2) computing a distance measure or other quantitative comparison of the ordered vector sequences. Such quantitative comparison finds application in speech recognition (where the objects are audio sequences representing spoken words or phrases), image content spotting (where the objects may be image portions showing an object of interest), biological sequence processing (where the objects may be DNA sub-sequences, protein sub-sequences, or so forth), as well as the aforementioned on-line and offline handwriting recognition applications.

BRIEF DESCRIPTION

In some illustrative embodiments disclosed as illustrative examples herein, a storage medium stores instructions executable to compare an input vector sequence with a reference semi-continuous hidden Markov model (SC-HMM) having a model basis and an ordered sequence of reference weight parameters. The comparison uses a comparison method including: modeling the input vector sequence using a SC-HMM having the model basis to generate an ordered sequence of input vector weight parameters; and comparing the ordered sequence of input vector weight parameters and the ordered sequence of reference weight parameters to generate a quantitative comparison measure.

In some illustrative embodiments disclosed as illustrative examples herein, an object comparison method is disclosed, comprising: generating a first ordered vector sequence representation of a first object; generating a second ordered vector sequence representation of a second object; representing the first object by a first ordered sequence of model parameters generated by modeling the first ordered vector sequence representation using a semi-continuous hidden Markov model employing a universal basis; representing the second object by a second ordered sequence of model parameters generated by modeling the second ordered vector sequence representation using a semi-continuous hidden Markov model employing the universal basis; and comparing the first and second ordered sequences of model parameters to generate a quantitative comparison measure.

In some illustrative embodiments disclosed as illustrative examples herein, a document processing system is disclosed, comprising: segmenting at least one image of a page of a document to generate a plurality of word or phrase images; generating input ordered vector sequence representations of the plurality of word or phrase images; modeling the input ordered vector sequence representations to generate corresponding weight parameter sequences using a semi-continuous hidden Markov model employing a Gaussian mixture model (GMM) basis whose constituent Gaussian components have fixed mean and spread parameters; and labeling the document based on comparison of the weight parameter sequences with one or more word or phrase of interest models.

DETAILED DESCRIPTION

Figure 1:
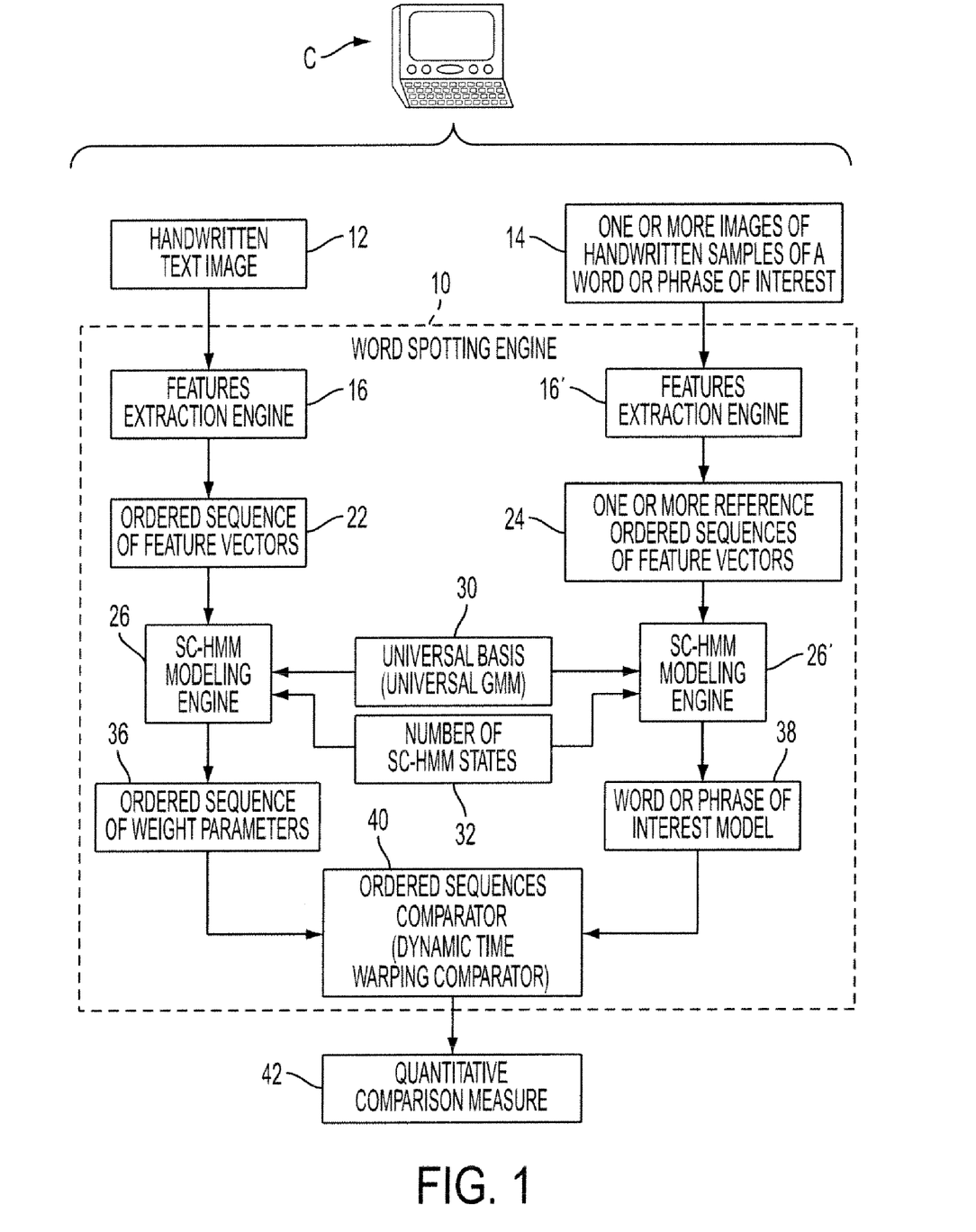
FIG. 1 diagrammatically shows an illustrative word spotting engine.

With reference to FIG. 1, an illustrative word spotting engine 10 processes a handwritten text image 12 to quantitatively assess similarity of the handwritten text image 12 with one or more images of handwritten samples of a word or phrase of interest 14. The images 12, 14 are suitably generated by optical scanning of handwritten documents, or by direct electronic input of handwritten content, for example using a tablet personal computer ("tablet PC") or a personal data assistant (PDA) that has a touch sensitive screen on which a user can handwrite using a pen, stylus or other suitable handwriting instrument. Generation of the images 12, 14 may optionally also entail segmentation to isolate or identify the text image 12, 14 as a component of a document page image or other larger image. The images 12, 14 can be stored in any suitable image format, such as JPEG, TIFF, GIF, PNG, or so forth. The images 12, 14 are optionally also normalized with respect to skew, slant, and size to enhance comparability of the images 12, 14 with respect to these aspects.

The word spotting engine 10 includes a features extraction engine 16 that processes the handwritten text image 12 to generate a corresponding ordered sequence of feature vectors 22. In a suitable approach the ordered sequence of feature vectors 22 is obtained by sliding a window from left to right and computing for each window a set of features (that is, a feature vector). Some suitable feature types are set forth, for example, in: Marti et al., "Using a statistical language model to improve the performance of an HMM-based cursive handwriting recognition system", Int. J. of Pattern Recognition and Artificial Intelligence, vol. 15 pp. 65-90 (2001) which is incorporated herein by reference in its entirety; Vinciarelli et al., "Offline recognition of unconstrained handwritten texts using HMMs and statistical language models", IEEE Transactions on Pattern Analysis and Machine Intelligence, vol. 26 no. 6, pp. 709-20 (2004) which is incorporated herein by reference in its entirety; and Rodriguez et al., "Local gradient histogram features for word spotting in unconstrained handwritten documents", in 2008 International Conference on Frontiers in Handwriting Recognition (ICFHR 2008) which is incorporated herein by reference in its entirety. Similarly, the word spotting engine 10 includes a features extraction engine 16' that processes the one or more images 14 of handwritten samples of the word or phrase of interest to generate a corresponding one or more reference ordered sequences of feature vectors 24. The transformation performed by the features extraction engine 16' should be operatively identical with the transformation performed by the features extraction engine 16, and indeed the two engines 16, 16' may be one and the same engine, although the use of different but functionally equivalent features extraction engines 16, 16' is also contemplated.

The ordered sequence of feature vectors 22, on the one hand, and the one or more reference ordered sequences of feature vectors 24, on the other hand, provide a suitable basis for comparing the images 12, 14. Indeed, in some existing word spotting engines in which the reference is a single image, a dynamic time warping (DTW) distance is applied directly to the ordered sequences 22, 24 to compute a quantitative comparison measure. However, this approach is not directly applicable to a plurality of reference images, and moreover such an approach does not utilize a priori knowledge that each handwritten word or phrase is made up of a set of handwritten letters or digits (or, more generally, symbols) chosen from an alphabet or other set of a prior known symbols. It is desired herein to utilize such a priori knowledge to enhance computational speed, to enhance accuracy, or to enhance both speed and accuracy.

Toward this end, the ordered sequence of feature vectors 22 is modeled using a semi-continuous hidden Markov model (SC-HMM) modeling engine 26 employing a universal basis 30 that incorporates a priori knowledge about the set of handwritten letters or digits, or more generally, symbols, that are expected to make up the text of the images 12, 14. In some illustrative embodiments described herein, the universal basis 30 is a Gaussian mixture model (GMM) in which the Gaussian components have fixed mean and spread parameters (where the "spread parameter" broadly denotes a variance, standard deviation, or other parameter indicative of the "width" of the Gaussian component) that represent the a priori information, but have adjustable weight parameters that are fitted by the SC-HMM modeling engine 26. The ordered sequence of feature vectors 22 is denoted herein as X of sequence length T with the constituent feature vectors denoted as $x_i$, i=1, . . . , T. In other words, the sequence is $X=\{x_1, x_2, \ldots, x_T\}$. In SC-HMM modeling, at each time t the system is assumed to be in a hidden state, denoted herein by a discrete latent variable $q_t$. The number of SC-HMM states 32 is a parameter of the modeling, and is denoted herein by N. Thus, there are N states labeled from 1 to N. The universal basis 30 for the illustrated SC-HMM modeling embodiment is a universal GMM with K Gaussian components. Each state i is described by three types of parameters: initial occupancy probabilities $\pi_i = p(q_1 = i)$; transition probabilities $a_{ij} = p(q_t = j | q_{t-1} = i)$; and emission probabilities $p(x_t | q_t = i)$. In the illustrative examples herein, a left-to-right HMM is assumed, with no jumps. Such a HMM has the following properties: $a_{ij} = 0$ if $j \neq i$ and $j \neq i+1$. The emission probabilities are assumed to be described by the illustrative universal GMM basis 30. It is also assumed in these illustrative examples that the spread parameters are diagonal covariance matrices since their computational cost is reduced and any distribution can be approximated with arbitrary precision by a mixture of Gaussians with diagona covariances.

It is useful to scale the number N of SC-HMM states 32 with the sequence length T of the ordered sequence of feature vectors 22. In the notation used herein, $N = v \cdot T$ where $v$ is a scaling factor in the range [0,1]. The parameter $v$ is also referred to herein as a "compression factor" because intuitively the SC-HMM compresses in $N = v \cdot T$ states the information contained in the T observations of the ordered sequence of feature vectors 22.

In SC-HMM modeling, all the Gaussian components of the emission probabilities are constrained to belong to a shared set of K Gaussians, referred to herein as the universal basis 30. In other words, the mean and spread parameters of the K Gaussians are not adjusted during the SC-HMM modeling. Let $p_k$ denote the k-th Gaussian component of the universal GMM 30 which has a mean vector $p_k$ and a covariance matrix $\Sigma_k$. The emission probabilities can thus be written as:

$$p(x_t | q_t = i) = \sum_{k=1}^{K} \omega_{ik} p_k(x_t). \quad (1)$$

Hence, the SC-HMM parameters can be separated into sequence-independent or shared, that is, fixed or static, parameters including the mean $\mu_k$ and spread $\Sigma_k$ parameters, and sequence-dependent parameters including the transition probabilities $a_{ij}$ and the Gaussian component weight parameters $\omega_{ik}$. The fixed or static mean and spread parameters $\mu_k$ and $\Sigma_k$ inject the a priori information relating to handwriting style into the SC-HMM modeling.

The SC-HMM modeling engine 26 models the ordered sequence of feature vectors 22 using a SC-HMM with $N = v \cdot T$ states 32 and the universal basis 30 having K Gaussian components. In a suitable modeling approach, where again the static mean and spread parameters $\mu_k$ and $\Sigma_k$ of the GMM basis 30 are held fixed, the transition probabilities $a_{ij}$ and weight parameters $\omega_{ik}$ are suitably adjusted to model the ordered sequence 22 using an expectation-maximization (EM) algorithm employing the following re-estimation formulas:

$$\hat{a}_{ij} = \frac{\sum_{t=1}^{T-1} \xi_{ij}}{\sum_{t=1}^{T-1} \gamma_i(t)}, \quad (2)$$

and $$\hat{\omega}_{ik} = \frac{\sum_{t=1}^{T} \gamma_{ik}(t)}{\sum_{t=1}^{T} \sum_{n=1}^{N} \gamma_{in}(t)}, \quad (3)$$

Where $\gamma_i(t)$ is the probability that $x_t$ was generated by state i, $\gamma_{ik}(t)$ is the probability that $x_t$ was generated by state i and mixture component k, and $\xi_{ij}(t)$ is the probability that $x_t$ was generated by state i and $x_{t+1}$ by state j. These posteriors are suitably computed with a forward-backward algorithm. See, for example: Rabiner, "A tutorial on hidden Markov models and selected applications in speech recognition", Proc. of the IEEE vol. 77, pp. 257-86 (1989) which is incorporated herein by reference in its entirety.

The output of the SC-HMM modeling includes the fitted transition probabilities $a_{ij}$ and weight parameters $\omega_{ik}$. However, for most HMM modeling applications it is generally found that the fitted weight parameters $\omega_{ik}$ are substantially more discriminative as compared with the transition probabilities $a_{ij}$. Accordingly, in the illustrative embodiment the output of the SC-HMM modeling engine 26 is an ordered sequence of weight parameters 36, that is, the ordered sequence of the fitted weight parameters $\omega_{ik}$. In other contemplated embodiments, the ordered sequence of fitted transition probabilities $a_{ij}$ are contemplated to be included in addition to or alternative to using the ordered sequence of the fitted weight parameters $\omega_{ik}$.

Similarly, the word spotting engine 10 includes a SC-HMM modeling engine 26' that models the one or more reference ordered sequences of feature vectors 24 using a SC-HMM with $N = v \cdot T$ states 32 and the universal basis 30 having K Gaussian components. The modeling performed by the SC-HMM modeling engine 26' should be identical with the modeling performed by the SC-HMM modeling engine 26, and indeed the modeling engines 26, 26' may be one and the same engine, although the use of different but functionally equivalent SC-HMM modeling engines 26, 26' is also contemplated. In the case in which the one or more reference images 14 include a plurality of reference images, such as a training set of images of handwritten samples of the word or phrase of interest, the SC-HMM modeling suitably trains the adjustable parameters $a_{ij}$ and $\omega_{ik}$ respective to the reference set of training sample images, rather than respective to a single reference sample image. In either case, the output of the SC-HMM modeling engine 26' is a word or phrase of interest model 38 defined by the ordered sequence of fitted weight parameters $\omega_{ik}$. The transition parameters $a_{ij}$ are optionally included as an additional or alternative model component.

The representations 36, 38 for the handwritten text image 12 and the reference text image or images 14 advantageously incorporate the a priori information of the GMM basis 30 through the shared fixed or static mean and spread parameters $\mu_k$ and $\Sigma_k$. Additionally, the representations 36, 38 are compact. The ordered sequence of fitted weight parameters $\omega^{ik}$ runs over the index $i = 1, \ldots, N = v \cdot T$ and $k = 1, \ldots, K$ so that the total number of weight parameters is $N \times K$ where N is the number of SC-HMM states and K is the number of Gaussian components of the GMM basis 30. An ordered sequences comparator, such as an illustrative dynamic time warping (DTW) distance comparator 40, suitably operates on the representations 36, 38 to generate a quantitative comparison measure 42. Instead of the illustrated DTW comparator, substantially any other type of comparator can be used. The comparator preferably considers the possible alignments between the ordered sequences 36, 38, and can use various methods for the local measure of similarity between states (i.e. weight vectors), such as Bayes probability of error, Kullback-Leibler (KL) divergence, or Bhattacharyya similarity. The comparator can consider the best path or a sum over all paths. The DTW distance considers the best path and is illustrated, although other distances or other comparison algorithms are also contemplated.

DTW is an elastic distance between vector sequences. For two sequences of vectors X and Y of length $T_X$ and $T_Y$, respectively, DTW considers all possible alignments between the sequences, where an alignment is a set of correspondences between vectors such that certain conditions are satisfied. For each alignment, the sum of the vector-to-vector distances is determined, and the DTW distance is defined as the minimum of these distances or, in other words, the distance along the best alignment, also referred to as warping path. The direct evaluation of all possible alignments is computationally expensive. Accordingly, in most DTW implementations a dynamic programming algorithm is used to compute a distance in quadratic time. It takes into account that the partial distance DTW(m,n) between the prefixes $\{x_1, \ldots, x_m\}$ and $\{y_1, \ldots, y_n\}$, where m=1, ..., $T_X$ and n=1, ..., $T_Y$. The partial distance DTW(m,n) is suitably given by:

$$DTW(m, n) = \min \begin{Bmatrix} DTW(m-1, n) \\ DTW(m-1, n-1) \\ DTW(m, n-1) \end{Bmatrix} + d(m, n), \quad (4)$$

where d(m,n) is the vector-to-vector distance between $x_m$ and $y_n$, for example expressed as a Euclidean distance. Dividing the DTW distance by the length of the warping path typically leads to an increase in performance. The distance function d(_,_) is optionally replaced by a similarity measure, which entails changing the min{...} into a max {...} in Equation (4). Because one can apply Equation (4) to fill the matrix DTW(m,n) in a row-by-row manner, the cost of the algorithm is of order $O(T_X T_Y D)$ where D is the dimensionality of the feature vectors.

To extend the DTW distance to state sequences, it is sufficient to replace the vector-to-vector distance d(_,_) by a state-to-state distance. The sequence-dependent state parameters of interest are the ordered sequences of mixture weights 36, 38. Hence, the distance between two states may be defined as the distance between two vectors of mixture weights. It the case of a Bhattacharyya similarity measure, this can be shown to correspond to an approximation of the true Bhattacharyya similarity between the GMMs. In the following, $f=\sum_{i=1}^{M} \alpha_i f_1$ and $g=\sum_{j=1}^{N} \beta_j g_j$ denote the two GMMs output by the SC-HMM modeling engine 26 and the SC-HMM modeling engine 26', respectively, $\alpha=[\alpha_1 \ldots \alpha_M]$ is a vector of the weights $\alpha_i$ of the GMM output by the SC-HMM modeling engine 26, and $\beta=[\beta_1 \ldots \beta_N]$ is a vector of the weights $\beta_j$ of the GMM output by the SC-HMM modeling engine 26'. The probability product kernel (PPK) is suitably defined as:

$$K_{ppk}^{\rho}(f, g) = \int_x (f(x)g(x))^\rho dx. \quad (5)$$

See Jebara et al., "Probability product kernels", Journal of Machine Learning Research vol. 5 pp. 819-44 (2004), which is incorporated herein by reference in its entirety. The Bhattacharyya similarity is a special case: $B(f,g)=K_{ppk}^{1/2}(f,g)$. There is no closed-form formula for the Bhattacharyya similarity B in the case where f and g are Gaussian mixture models, but can be approximated by using the following upper bound to approximate B:

$$B(f, g) \leq \sum_{i=1}^{M} \sum_{j=1}^{N} (\alpha_i \beta_j)^{1/2} B(f_i, g_j). \quad (6)$$

The values $B(f_i, g_j)$ correspond to the Bhattacharyya similarities between pairs of Gaussian components for which a closed form formula exists. See, for example, Jebara et al., "Probability product kernels", Journal of Machine Learning Research vol. 5 pp. 819-44 (2004), which is incorporated herein by reference in its entirety. In the case of SC-HMMs, the GMM emission probabilities are defined over the same set of Gaussian components, that is, M=N, $f_i=g_j$ and the values $B(f_i, g_j)$ may be pre-computed. In such a case, the similarity between two states is just a similarity between the corresponding two weight vectors.

However, the computational cost remains quadratic in the number of Gaussian components, which for some typical applications may be of order a few to a few hundred or larger. If it is desired to reduce computational cost, the following additional approximation on the bound is optionally made, wherein it is assumed that the Gaussian components are well-separated. That is, it is assumed that $B(f_i, g_j)=0$ if i≠j. This approximation is typically increasingly reasonable as the dimensionality of the feature space increases. By definition, $B(f_i, f_i)=1$. This leads to the following approximation:

$$B(f, g) \approx B(\alpha, \beta) = \sum_{i=1}^{M} (\alpha_i, \beta_i)^{1/2}, \quad (7)$$

which is the discrete Bhattacharyya distance between the weight vectors α and β. If the square roots of the weight vectors are stored, then this quantity is efficient to compute as a dot product.

Figure 2:
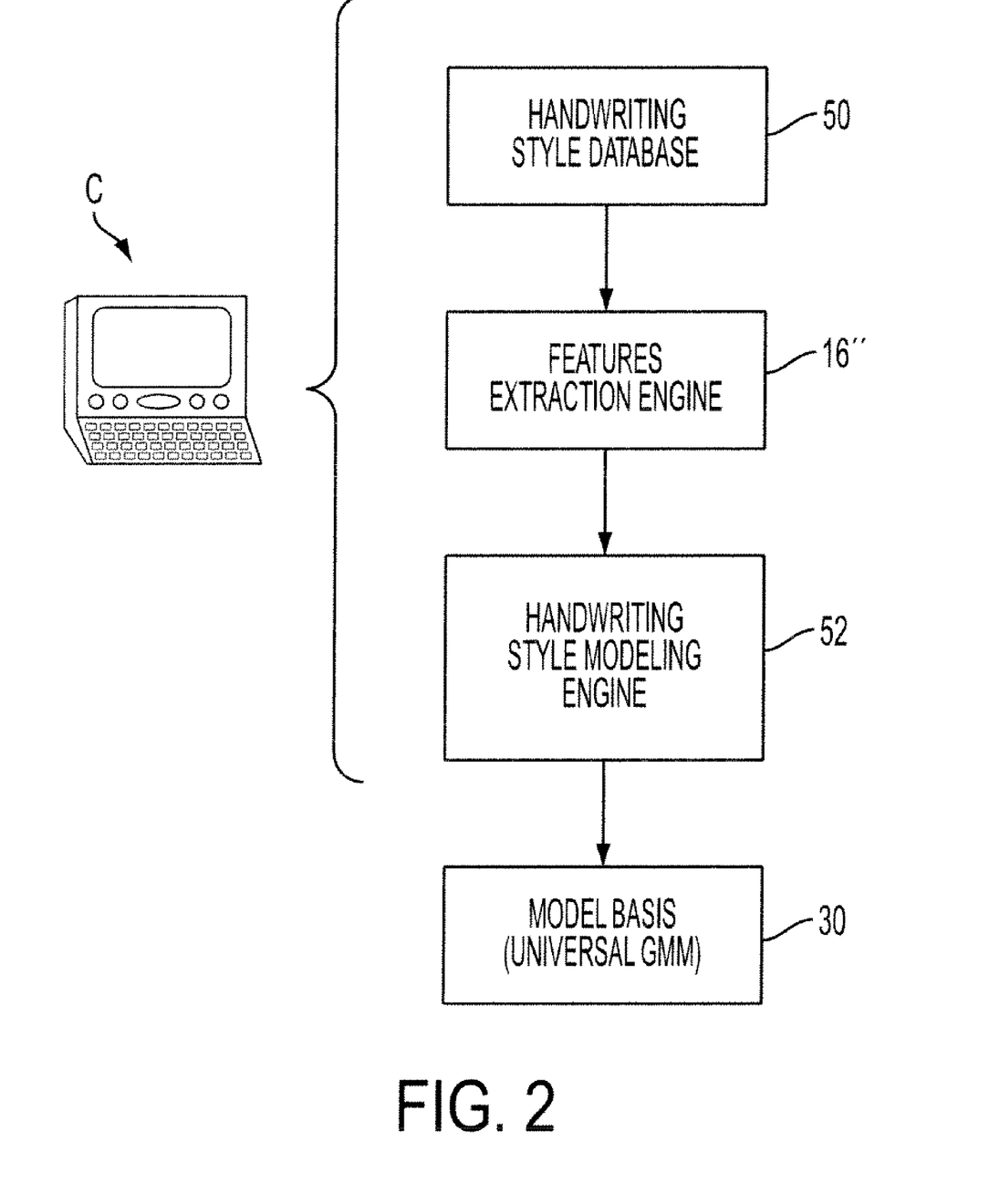
FIG. 2 diagrammatically shows an illustrative system for generating a universal basis for use in the word spotting engine of FIG. 1.

With reference to FIG. 2, a suitable approach for generating the universal GMM model 30 is described. It is desired for the GMM model 30 to embody a priori information about handwriting style. Toward this end, a handwriting style database 50 is provided, which includes images of various handwritten samples. The handwriting style database 50 contains handwriting samples sufficient in number and diversity so as to represent the range of handwriting styles that are expected to be encountered by the word spotting engine 10. To provide sufficient diversity, samples may be taken from persons living in a geographical area of interest, and/or from persons having educational levels spanning an expected range of encountered writers, and/or so forth. At the opposite extreme, it is contemplated for the word spotting application to process only documents written by a single writer (for example, if the application is to analyze the extensive writings of a historical person who was a prolific letter writer), for which application the handwriting style database suitably contains images of handwritten samples only from the single writer of interest. The handwriting style database 50 is typically not limited to the word or phrase of interest, but rather includes a diversity of words or phrases providing diversity of handwriting samples so as to provide a comprehensive profile of the handwriting styles that are likely to be encountered by the word spotting engine 10.

The sample images of the handwriting style database 50 are processed by a features extraction engine 16" which is functionally equivalent to the features extraction engine 16 (and, indeed, may optionally be embodied as one and the same engine) to generate a sequence of feature vectors for each handwriting sample image. A handwriting style modeling engine 52 suitably trains the universal GMM that serves as the universal basis 30 using the sequences of feature vectors extracted by the features extraction engine 16". In this training, the sequence order of the feature vectors extracted from a sample image is disregarded, so that the sequences of feature vectors is instead considered as a (typically large) unordered set of feature vectors. As the sliding window moves along the text image during feature vectors extraction, the sliding window samples typical writing primitives such as letters, parts of letters or connectors between letters. By fitting all GMM parameters including the weight parameters $\omega_k$, the mean parameters $\mu_k$, and the spread parameters $\Sigma_k$, to the unordered set of feature vectors, a "vocabulary" of Gaussian components is generated. A suitable algorithm for training the universal GMM 30 is the expectation-maximization (EM) algorithm, described for example in Bilmes, "A gentle tutorial of the EM algorithm and its application to parameter estimation for Gaussian mixture and hidden Markov models", Technical Report TR-97-021, Int. Computer Science Institute, (1998), which is incorporated herein by reference in its entirety. After the training, the fitted mean and spread parameters $\mu_k$ and $\Sigma_k$ are treated as fixed, static parameters that carry the a priori information during subsequent modeling by the SC-HMM modeling engine 26, 26'.

In the foregoing, the handwritten text object 12 is a single object while the one or more images of handwritten samples of a word or phrase of interest can be a single object or a plurality of objects. It is also contemplated for the object 12 to also comprise a plurality of objects, so that the system of FIG. 1 can be used to compare two sets of objects, such as two sets of handwritten text images.

Figure 3:
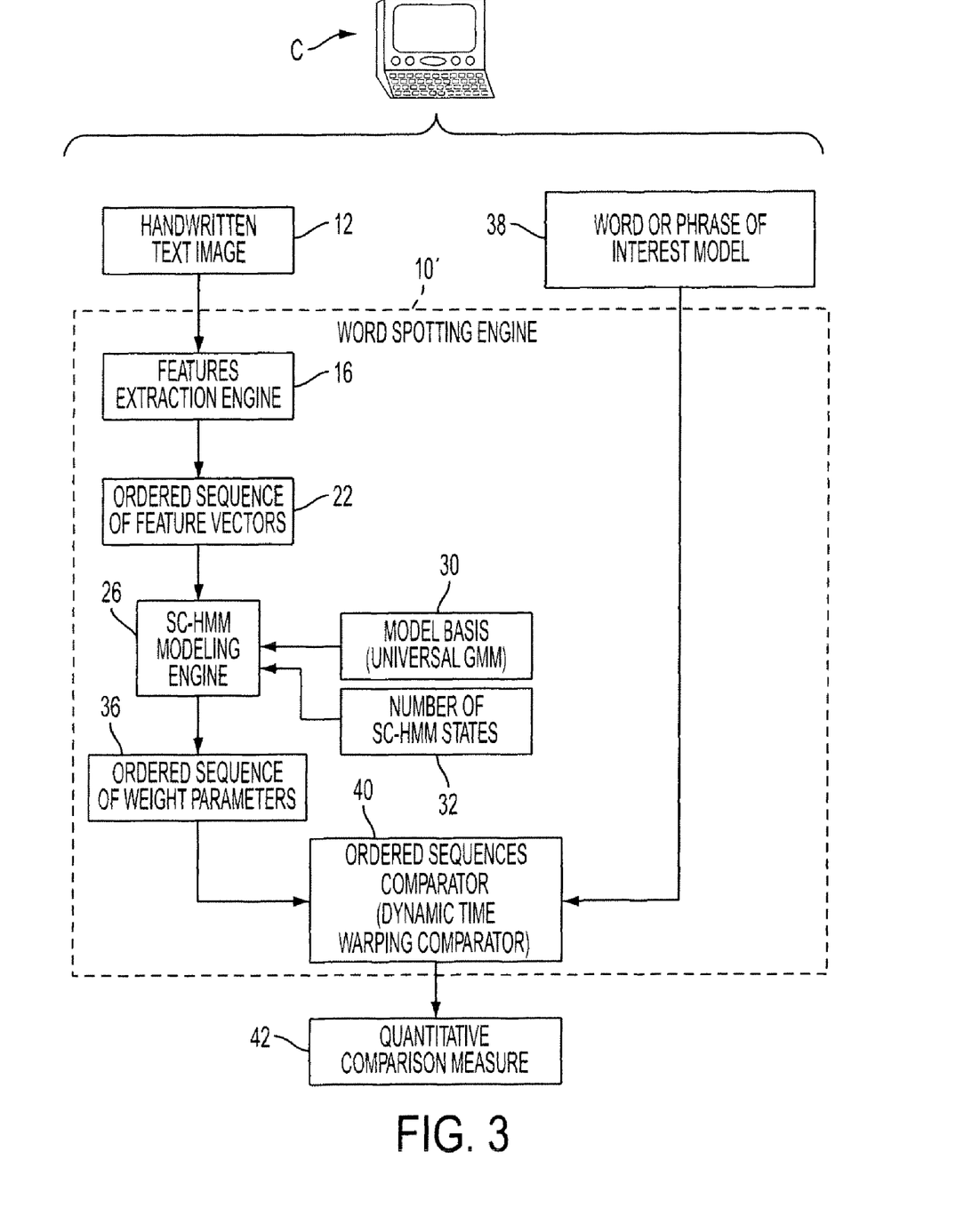
FIG. 3 diagrammatically shows a modified version of the word spotting engine of FIG. 1, in which the word or phrase of interest models are generated and stored prior to performing a word spotting operation.

With reference to FIG. 3, a variant word spotting engine 10' is illustrated. This word spotting engine is identical with the word spotting engine 10 of FIG. 1, except that the components 16', 26' for generating the word or phrase of interest model 38 are omitted from the word spotting engine 10', and instead the word or phrase of interest model 38 is an input to the word spotting engine 10'. The variant word spotting engine 10' illustrates the observation that the processing that generates the word or phrase of interest model 38 from the one or more images of handwritten samples of a word or phrase of interest 14 can be performed once, by a suitable model preparation system (not expressly illustrated) comprising the omitted components 16', 26', and the resulting word or phrase of interest model 38 stored for later retrieval and use by the word spotting engine 10'. This approach enhances processing efficiency in some applications by not re-computing the word or phrase of interest model 38 each time a new input word or phrase of interest 12 is received for quantitative comparison.

Figure 4:
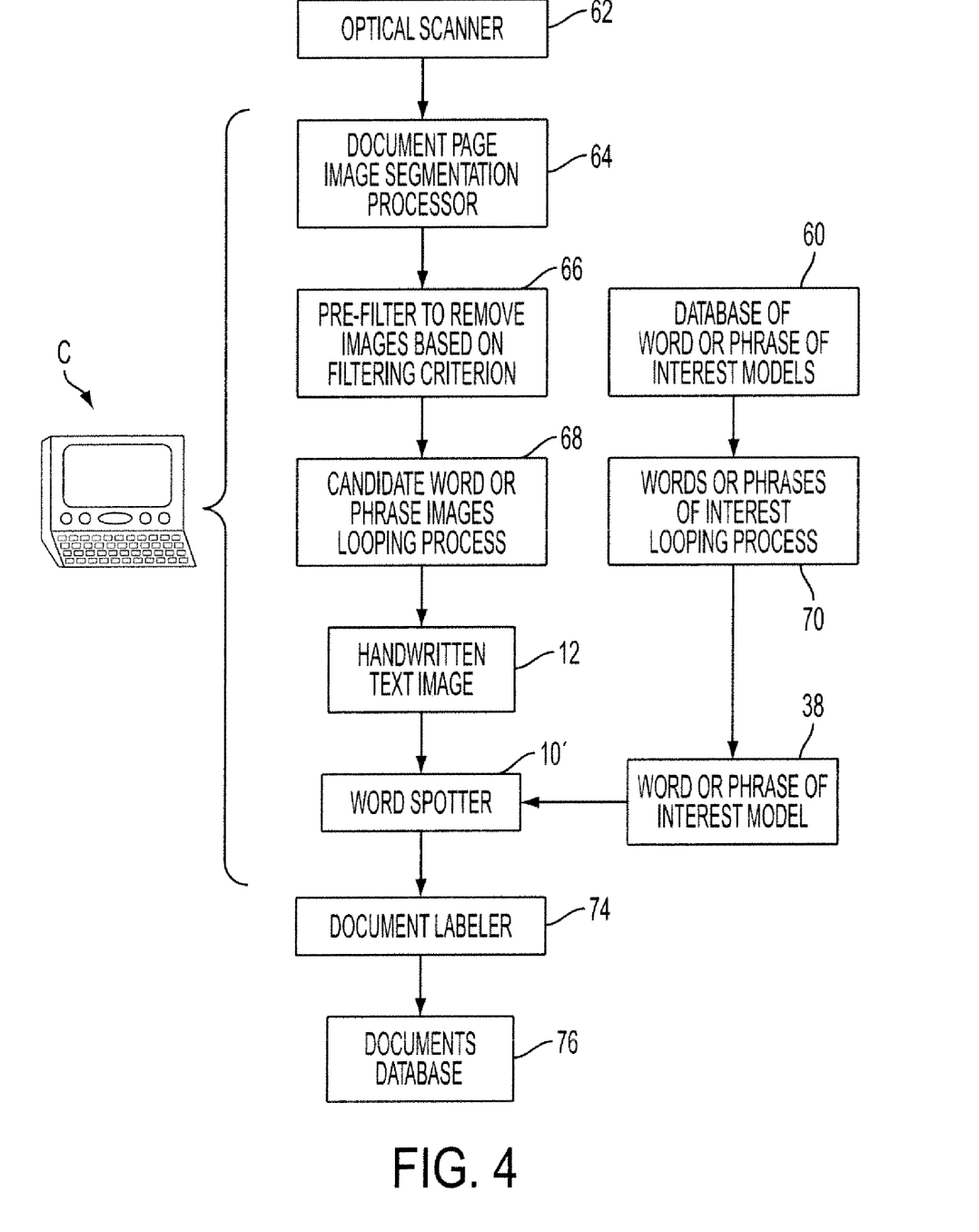
FIG. 4 diagrammatically shows a document labeling system employing the word spotting engine of FIG. 3.

With reference to FIG. 4, an illustrative document labeling and archiving system is shown which utilizes the variant word spotting engine 10' and a database of word or phrase of interest models 60 that include models for words or phrases of interest for labeling documents undergoing archiving. For example, if the archiving is intended to label documents by topic, then words or phrases of interest for identifying documents related to the topic of global warming may include, for example: "ozone", "global warming", "polar ice caps", "greenhouse", or so forth. For each such word or phrase of interest, the components 16', 26' (see FIG. 1) are applied to create a corresponding word or phrase of interest model that is stored in the database 60.

In a typical processing paradigm, documents are received in paper form and are scanned using an optical scanner 62 to generate images of document pages. The document scanned by the optical scanner 62 are typically a handwritten document, although the word spotting techniques disclosed herein are also contemplated to be applied to spot typed words or words printed in a computer-generated font. As used herein, the term "handwritten document" or similar phraseology denotes a document having handwritten content that is or that may be, of interest. As such, a handwritten document may include substantial, or even mostly, computer generated or typewritten text. For example, a computer-generated form that is filled out by hand may consist mostly of computer-generated text written in a computer type font. Nonetheless, such a form when filled out by hand is considered to be a handwritten document because the content of interest are the handwritten form entries.

The images of document pages are processed by a document page image segmentation processor 64 to isolate or identify text images (or, rather, sub-images of the document page image) that represent handwritten words or phrases. Optionally, the segmentation processor 64 may also normalize the extracted text images with respect to skew, slant, and size to enhance uniformity with respect to these aspects. Optionally, a pre-filter 66 performs pre-filtering based on selection criteria to remove from consideration text images that fail to meet certain qualifications. For example, the pre-filter 66 optionally removes those text images whose normalized size corresponds to a word or phrase having fewer letters than the shortest word or phrase of interest. Such pre-filtering can, for example, remove all one- or two-letter words. Pre-filtering optionally may also consider criteria such as the horizontal-vertical aspect ratio of a rectangle containing the text image, again using this criteria to remove text images that have an aspect ratio that cannot match that of any word or phrase of interest.

The segmented text images that pass the pre-filter 66 are then deemed to be candidate text images that are processed in serial fashion by a looping process 68 to process each candidate text image in turn as the handwritten text image 12 that is inputted to the word spotter 10'. Additionally, the models stored in the database of word or phrase of interest models 60 are processed in serial fashion by a looping process 70 to process each model in turn as the word or phrase of interest model 14 that is inputted to the word spotter 10'. In this manner, each candidate text image is compared with each word or phrase of interest model to generate a set of quantitative comparison measures for assessing whether the candidate text image matches any word or phrase of interest. A document labeler 74 uses this information to label the document. For example, if the document includes more than a threshold number of words or phrases that are of interest for the topic of global warming, then the document is labeled by the document labeler 74 with the subject tag "global warming". The optically scanned document pages are suitably concatenated to form a pdf file or other concatenated file storing the document, which is then stored in a documents database 76 along with metadata including any labels applied to the document by the document labeler 74. Additionally or alternatively, other uses can be made of the document labeling. For example, in one alternative embodiment, only those documents that the labeler 74 indicates are relevant to a topic or topics of interest are stored in the documents database 76. In another alternative embodiment, those documents that the labeler 74 indicates are relevant to a topic or topics of interest are forwarded to a human reviewer (for example, via email) for further consideration and review by the human reviewer.

As already noted, the illustrative SC-HMM modeling engine 26 performs SC-HMM modeling using the number N of SC-HMM states 32, the ordered sequence of feature vectors 22 has sequence length T, and the notation N=v·T has been introduced, where v is a scaling factor in the range [0,1] that is also referred to herein as a "compression factor" because intuitively the SC-HMM compresses in N=v·T states the information contained in the T observations of the ordered sequence of feature vectors 22. In general, if v=1 then N=T and this is considered to be a compressionless SC-HMM modeling process. On the other hand, for v<1 it follows that the number of states N is less than the sequence length T, and the SC-HMM modeling process is considered to perform compression in which some reduction in retrieval accuracy (for word spotting applications) is accepted in return for enhanced computational speed. The impact of the compression factor v is now considered further.

The cost of the DTW measure is of order $O(T_X T_Y D)$ where D is the dimensionality of the feature vectors. The cost of the similarity measure implemented by the system of FIG. 1 or by the system of FIG. 3 can be shown to be of order $O(v^2 T_X T_Y K)$ for $0 \leq v \leq 1$, where it will be recalled that K is the number of Gaussian components of the universal GMM basis 30. It follows that for K=D the computational cost is reduced by a factor of $1/v^2$ as compared with the DTW distance measure.

Word spotting systems have been constructed by the inventors that employ a quantitative comparison measure substantially in accordance with the system of FIG. 1, and the performance was compared with a word spotting employing a DTW distance measure by itself. Tests employed using the actually constructed word spotting system confirmed that a decrease in performance and increased processing speed generally result as the compression factor v is reduced. Accordingly, performance of the word spotting system (or other application of the disclosed quantitative ordered vector sequence comparison techniques) can be tuned by adjusting the compression factor v. In general, higher values of the compression factor v provide improved accuracy, while lower values of the compression factor v provide improved speed. In some word spotting tests, it was found that with the compression factor v in the range $0.1 \leq v \leq 0.2$ (corresponding to a computational cost enhancement $1/v^2$ in the range 25-100 as compared with the DTW measure operating alone) provided performance comparable to or even slightly better than word spotting employing the DTW measure operating alone.

These computational cost values are for the ordered sequences comparator 40, and do not take into account the computational time for the processing performed by the SC-HMM modeling engines 26, 26'. However, as shown in FIG. 3 in a typical word spotting scenario the word or phrase of interest models 38 are suitably precomputed. Accordingly, the computational cost of the SC-HMM modeling engine 26' is not relevant. Moreover, if each handwritten text image 12 is to be compared with a plurality of word or phrase of interest models 38 (as shown, for example, in FIG. 4), then the processing of the SC-HMM modeling engine 26 can be performed only once for each handwritten text image 12 so as to generate the corresponding ordered sequence of weight parameters 36, and thereafter is suitably re-used by the ordered sequences comparator 40 for the comparison with each of the word or phrase of interest model 38. In the number of word or phrase of interest models is substantial, which is often the case for word spotting applications, then the computational cost of the ordered sequences comparator 40 dominates.

The word spotting engines 10, 10' of FIGS. 1 and 3, as well as the handwriting style modeling engine 52 of FIG. 2 and the document labeling system of FIG. 4, can be embodied in various ways. In the illustrated embodiments, a computer C includes a digital processor that is suitably programmed to perform the operations of these systems. Other suitably programmed digital processors or controllers or devices including same can also be used, such as an Internet-based server system, or a personal data assistant (PDA), or an automated forms receiving system, or so forth. Additionally or alternatively, a storage medium suitably stores instructions executable by such a processor or controller to implement one or more of the disclosed word spotting engines 10, 10' of FIGS. 1 and 3, the handwriting style modeling engine 52 of FIG. 2, and the document labeling system of FIG. 4. The storage medium may, for example, comprise a hard disk or other magnetic storage medium that may be a standalone component or an integral part of a computer or other digital processing device, or an optical disk or other optical storage medium that may be a standalone component or an integral part of a computer or other digital processing device, or a FLASH memory or other electrostatic storage medium that may be a standalone component or an integral part of a computer or other digital processing device, or so forth.

Another advantage of the approach disclosed herein employing a priori information about handwriting via the universal model 30 is that it is possible to perform word spotting on handwritten text images using reference sample text images generated using a computer generated font. In other words, in these embodiments the handwritten text image 12 remains as handwritten, but the one or more images 14 of handwritten samples of a word or phrase of interest are replaced by one or more images of typed or computer generated samples of a word or phrase of interest. The advantage of typed text samples is that queries can be automatically generated on-line for any query string by rendering from typographic fonts. However, this approach has not heretofore been practicable, because typed text shapes are not generally representative of handwritten ones, and the substantial uniformity of typed text images does not reasonably represent the substantial variability in handwritten images.

However, using the similarity measure of FIG. 1 or of FIG. 3 overcomes this deficiency due to the a priori information regarding handwriting generally that is contained in the universal basis 30, which is trained using the handwriting style database 50 as depicted, for example, in FIG. 2. Accordingly, when the SC-HMM modeling engine 26' processes images of samples of a word or phrase of interest represented as typed text or text printed using a computer-generated font, the fixed or static mean and spread parameters μhd k and $\Sigma_k$ of the universal GMM basis 30 inject the a priori information relating to handwriting style into the SC-HMM model of the typed or computer-generated samples of the word or phrase of interest.

To demonstrate the ability of the system of FIG. 1 to employ typed or computer-generated textual samples in place of the handwritten samples 14 shown in FIG. 1, the actually constructed word spotting system employing the quantitative comparison measure of FIG. 1 was applied using typed or computer-generated textual samples for the input 14. It was found that performance using samples printed using a single computer-generated font was poor. However, substantially improved performance was obtained by constructing the input 14 using samples printed using a variety of computer-generated fonts that have similarity with typical handwriting.

Figure 5:
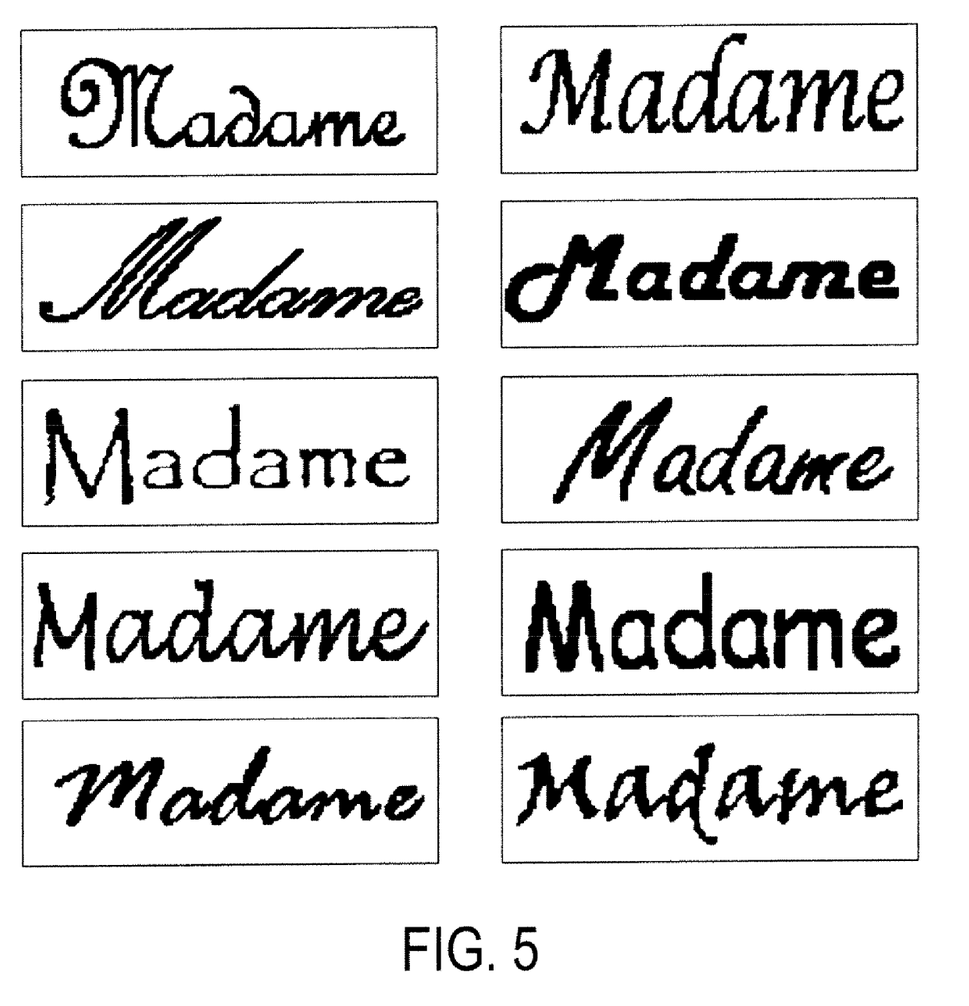
FIG. 5 depicts a training set of ten images of computer-generated text of the word of interest "Madame" in ten different computer-generated fonts.

With reference to FIG. 5, for example, the word of interest "Madame" is printed using ten computer-generated fonts that are designed to mimic handwriting. The ten fonts shown in FIG. 5 are (from top to bottom and from left to right): French Script; Kunstler Script; Papyrus; Lucida handwriting; Rage Italic; Lucida Calligraphy; Harlow Solid; Freestyle Script; Comic Sans; and Viner Hand. Performance was also found to be sensitive to the choice of feature vector, with the best results being obtained using local gradient histogram (LGH) features. See Rodriguez et al., "Local gradient histogram features for word spotting in unconstrained handwritten documents", in 2008 International Conference on Frontiers in Handwriting Recognition (ICFHR 2008) which is incorporated herein by reference in its entirety. Experiments were performed using LGH features and the training set for the word of interest "Madame" shown in FIG. 5, without applying any kind of pruning (e.g. based on width/aspect ratio), using the quantitative comparison measure of FIG. 1 and also using the DTW measure alone. Performance using the quantitative comparison measure of FIG. 1 was substantially better than that obtained using the DTW measure alone, with the improvement being a factor of two based on some quantitative performance measures.

Without being limited to any particular theory of operation, it is believed that the substantial improvement in performance using the quantitative comparison measure of FIG. 1 is due to a priori information about typical handwriting variability injected into the word of interest model by the universal GMM basis 30 which was trained using a diversity of handwriting samples.

The illustrative embodiments pertain to word spotting which is used herein as an illustrative example. However, disclosed quantitative comparison measures are generally applicable to the quantitative comparison of substantially any type of object that can be represented by an ordered sequence of vectors. The object may, for example, be text images (as in the illustrative embodiment), or recorded speech, or images, or biological sequences, or so forth.

For example, if the object type is speech content, then the features extraction engine 16 is suitably configured to generate ordered sequence of vectors by, for example, applying a temporally sliding window along the speech content and extracting a feature vector representative of the audio content within each temporal window. The one or more samples 14 of the word or phrase of interest in this speech recognition application are suitably one or more recorded samples of the word or phrase of interest spoken by one or more individuals. The universal basis 30 is suitably generated by replacing the handwriting style database 50 with a speech styles database containing a diversity of recorded speech articulated by a representative number of individuals.

Another example application is image content spotting. Here, the features extraction engine 16 is suitably configured to generate ordered sequence of vectors by, for example, selecting key patches (that is, small regions of the image) according to a grid or other selection pattern or selection algorithm, and extracting image features defining a feature vector from each key patch. The one or more samples 14 of the word or phrase of interest in this image content spotting application are suitably one or more images of a subject of interest (for example, the subject of interest may be "an animal" and the sample images are suitably images of cats, dogs, rabbits, or so forth. The universal basis 30 is suitably generated by replacing the handwriting style database 50 with in images database containing images representative of the diversity image content expected to be processed by the image content spotting system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a digital processing device to perform a comparison method including:
generating an input ordered vector sequence representing an input object,
modeling the input ordered vector sequence using a reference semi-continuous hidden Markov model (SC-HMMI) having a Gaussian Mixture Model (GMM) model basis containing a priori information about the input object and an ordered sequence of reference weight parameters to generate an ordered sequence of input vector weight parameters, and
comparing the ordered sequence of input vector weight parameters and the ordered sequence of reference weight parameters to generate a quantitative comparison measure.

2. The non-transitory storage medium as set forth in claim 1, wherein the stored instructions are further executable to generate the reference SC-HMM by modeling a single reference ordered vector sequence using a SC-HMM having the GMM model basis.

3. The non-transitory storage medium as set forth in claim 1, wherein the stored instructions are further executable to generate the reference SC-HMM by modeling a training set including a plurality of reference ordered vector sequences using a SC-HMM having the GMM model basis.

4. The non-transitory storage medium as set forth in claim 1, wherein the stored instructions are further executable to generate the reference SC-HMM by extracting an ordered sequence of feature vectors from an input image and modeling the ordered sequence of feature vectors using a SC-HMM having the GMM model basis.

5. The non-transitory storage medium as set forth in claim 4, wherein the stored instructions are further executable to generate the reference SC-HMM by (I) extracting one or more ordered sequences of feature vectors from a corresponding one or more reference images to generate a training set and (II) modeling the training set using a SC-HMM having the GMM model basis.

6. The non-transitory storage medium as set forth in claim 1, further storing instructions executable to define a word spotting application that invokes the instructions executable to perform the comparison method to compare an input ordered vector sequence with a reference SC-HMM with the input vector sequence derived from an input image of a handwritten word or phrase and the reference SC-HMM representing a handwritten word or phrase of interest.

7. The non-transitory storage medium as set forth in claim 6, further storing instructions to generate the reference SC-HMM based on images of the handwritten word or phrase of interest printed using a plurality of different computer-generated fonts.

8. The non-transitory storage medium as set forth in claim 1, wherein the comparing uses a dynamic time warping (DTW) distance to compare the ordered sequence of input vector weight parameters and the ordered sequence of reference weight parameters to generate a quantitative comparison measure.

9. The non-transitory storage medium as set forth in claim 1, wherein a number of states of the SC-HMM is less than a length of the input ordered vector sequence.

10. An object comparison method comprising:
  (i) generating a first ordered vector sequence representation of a first object; generating a second ordered vector sequence representation of a second object;
  (ii) representing the first object by a first ordered sequence of model parameters generated by modeling the first ordered vector sequence representation using a semi-continuous hidden Markov model employing a universal Gaussian Mixture Model (GMM) basis;
  (iii) representing the second object by a second ordered sequence of model parameters generated by modeling the second ordered vector sequence representation using a semi-continuous hidden Markov model employing the universal GMM basis; and
  (iv) comparing the first and second ordered sequences of model parameters to generate a quantitative comparison measure;
  wherein the universal GMM basis contains a priori information about the first and second input objects; and
  wherein the operations (i), (ii), (iii), and (iv) are performed by a digital processing device.

11. The object comparison method as set forth in claim 10, wherein at least one of the first object and the second object comprises a plurality of objects.

12. The object comparison method as set forth in claim 10, wherein the modeling operations adjust weight parameters of the Gaussian components of the GMM but do not adjust mean or spread parameters of the Gaussian components of the GMM.

13. The object comparison method as set forth in claim 12, wherein the first ordered sequence of model parameters and the second ordered sequence of model parameters comprise weight parameters of the Gaussian components of the GMM but do not comprise transition parameters of the semi-continuous Hidden Markov Model.

14. The object comparison method as set forth in claim 10, wherein:
  the first object is an image of a handwritten word or phrase or a plurality of images of a handwritten word or phrase,
  the second object is an image of a reference word or phrase of interest or a training set of images of reference samples of a word or phrase of interest; and
  the universal GMM basis contains a priori information about a set of symbols that are expected to make up the handwritten words or phrases.

15. The object comparison method as set forth in claim 14, further comprising:
  optimizing at least mean and spread parameters of a GMM basis to generate the universal GMM basis, the first ordered sequence of model parameters and the second ordered sequence of model parameters not including the mean and spread parameters.

16. The object comparison method as set forth in claim 14, further comprising:
  generating the first object by segmentation of an image of a page of a document; and
  labeling the document based on the quantitative comparison measure.

17. The object comparison method as set forth in claim 10, wherein the representing operations (ii) and (iii) employ a number of states of the semi-continuous hidden Markov model that is less than a length of first ordered vector sequence representation.

18. The object comparison method as set forth in claim 10, wherein the representing operations employ a number of states of the semi-continuous hidden Markov model that is equal to a length of first ordered vector sequence representation.

19. A document processing system comprising:
  a digital processing device programmed to perform a method including:
    segmenting at least one image of a page of a document to generate a plurality of word or phrase images;
    generating input ordered vector sequence representations of the plurality of word or phrase images;
    modeling the input ordered vector sequence representations to generate corresponding weight parameter sequences using a semi-continuous hidden Markov model employing a Gaussian mixture model (GMM) basis whose constituent Gaussian components have fixed mean and spread parameters that inject a priori information relating to writing style into the modeling; and
    labeling the document based on comparison of the weight parameter sequences with one or more word or phrase of interest models.

20. The document processing system as set forth in claim 19, wherein the labeling comprises:
  computing distance measures between the weight parameter sequences and the one or more word or phrase of interest models; and
  labeling the document based on the distance measures.

21. The document processing system as set forth in claim 19, wherein the fixed mean and spread parameters of the GMM basis are trained respective to a training set of images of handwritten text including at least some textual content not corresponding to the one or more word or phrase of interest models.

22. The document processing system as set forth in claim 21, wherein each of the one or more word or phrase of interest models are trained based on one or more images of a word or phrase of interest.

23. The document processing system as set forth in claim 21, wherein each of the one or more word or phrase of interest models are trained based on a plurality of images of a word or phrase of interest in different computer-generated type fonts.

* * * * *